United States Patent
Liu et al.

(10) Patent No.: US 9,805,158 B1
(45) Date of Patent: Oct. 31, 2017

(54) EFFICIENT EXTRACTION OF K-SIGMA CORNERS FROM MONTE CARLO SIMULATION

(71) Applicant: Cadence Design Systems, Inc., San Jose, CA (US)

(72) Inventors: Hongzhou Liu, Sewickley, PA (US); Stephan Weber, Bruckmuhl (DE); Wangyang Zhang, Allison Park, PA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 24 days.

(21) Appl. No.: 14/942,956

(22) Filed: Nov. 16, 2015

(51) Int. Cl.
    G06F 17/00 (2006.01)
    G06F 17/50 (2006.01)

(52) U.S. Cl.
    CPC ...... G06F 17/5081 (2013.01); G06F 17/5009 (2013.01)

(58) Field of Classification Search
    USPC .......................................................... 716/111
    See application file for complete search history.

(56) References Cited

U.S. PATENT DOCUMENTS

| | | |
|---|---|---|
| 8,589,852 B1 | 11/2013 | Liu et al. |
| 8,813,009 B1 | 8/2014 | Liu et al. |
| 8,954,908 B1 | 2/2015 | Liu et al. |
| 8,954,910 B1 | 2/2015 | Liu et al. |
| 2007/0198956 A1* | 8/2007 | Liu ...................... G06F 17/5068 716/54 |
| 2009/0248387 A1* | 10/2009 | Singhee .............. G06F 17/5036 703/16 |
| 2012/0259446 A1* | 10/2012 | McConaghy ....... G06F 17/5022 700/104 |

(Continued)

OTHER PUBLICATIONS

Silverman, "Using Kernel Density Estimates to Investigate Multimodality", Journal of the Royal Statistical Society, Series B (Methodological), vol. 43, Issue 1, pp. 97-99, 1981.

(Continued)

Primary Examiner — Mohammed Alam
(74) Attorney, Agent, or Firm — Andrews Kurth Kenyon LLP

(57) ABSTRACT

A system, method, and computer program product for efficiently finding the best Monte Carlo simulation samples for use as design corners for all design specifications to substitute for a full circuit design verification. Embodiments calculate a corner target value matching an input variation level by modeling the circuit performance with verified accuracy, estimate the corner based on a response surface model such that the corner has the highest probability density (or extrapolation from the worst sample if the model is inaccurate), and verify and/or adjust the corner by performing a small number of additional simulations. Embodiments also estimate the probability that a design already meets the design specifications at a specified variation level. Composite multimodal and non-Gaussian probability distribution functions enhance model accuracy. The extracted design corners may be of particular utility during circuit design iterations. A potential twenty-fold reduction in overall design specification verification time may be achieved.

20 Claims, 9 Drawing Sheets

(56) References Cited

U.S. PATENT DOCUMENTS

| 2013/0226544 | A1* | 8/2013 | Mcconaghy | G06F 17/5022 |
| | | | | 703/2 |
| 2013/0246986 | A1* | 9/2013 | Kuo et al. | G06F 17/5036 |
| | | | | 716/106 |
| 2013/0304439 | A1* | 11/2013 | Van der Velden | G06F 17/5009 |
| | | | | 703/6 |
| 2014/0258950 | A1* | 9/2014 | Barker | G06F 17/5081 |
| | | | | 716/112 |

OTHER PUBLICATIONS

Clopper et al., "The Use of Confidence or Fiducial Limits Illustrated in the Case of the Binomial", Biometrika, vol. 24, No. 4, pp. 404-413, Dec. 1934.

McConaghy et al., "Variation-Aware Design of Custom Integrated Circuits: A Hands-on Field Guide", (Book: Chapter 4b), 4.3—Sigma-Driven Corner Extraction, Springer, 2013.

* cited by examiner

EFFICIENT EXTRACTION OF K-SIGMA CORNERS FROM MONTE CARLO SIMULATION

CROSS-REFERENCE TO RELATED APPLICATIONS

This application is related to commonly-assigned patents:
"Statistical Corner Extraction Using Worst-Case Distance", issued as U.S. Pat. No. 8,589,852B1 on Nov. 19, 2013,
"Computing Device Mismatch Variation Contributions", issued as U.S. Pat. No. 8,813,009 on Aug. 19, 2014, and
"Device Mismatch Contribution Computation With Non-linear Effects", issued as U.S. Pat. No. 8,954,910 on Feb. 10, 2015.
This application is also related to commonly-assigned patent applications:
U.S. Ser. No. 14/581,958 entitled "Efficient Monte Carlo Flow Via Failure Probability Modeling", filed on Dec. 23, 2014, and
U.S. Ser. No. 14/683,021 entitled "Efficient Extraction Of The Worst Sample In Monte Carlo Simulation", filed on Apr. 9, 2015.
The aforementioned related patents and patent applications are hereby incorporated by reference in their entirety.

FIELD OF THE INVENTION

This description relates to the field of integrated circuit design, more specifically to circuit simulation, and yet more precisely to finding the best Monte Carlo simulation samples for use as design corners to substitute for a full design verification during design iterations.

BACKGROUND

The goals of integrated circuit design are not only to create a nominal circuit design that meets a set of predetermined specifications, but also to ensure that the circuit design can be manufactured reliably. Numerous sources of variation may cause some instances of a completed circuit design (e.g., fully simulated or fabricated microchips) to fail that is, to not achieve at least one of the predetermined design specifications. (Quite often, "testing" actually refers to full simulation prior to actual fabrication; that nomenclature is adopted in this description for simplicity.) Designers therefore seek to model such variation to estimate and reduce the susceptibility of manufactured designs to such failure.

Many methodologies for modeling variation are known in the art, including but not limited to those described in the related patents and patent applications previously incorporated by reference. Once an acceptably accurate variation model or "performance model" for a manufacturing process has been established, a number of Monte Carlo test samples may be selected according to the performance model and simulated to determine if particular design instances will fail. Even with recent advances in simulation technology however, performing a large number of Monte Carlo simulation runs of a design may still be computationally expensive.

When the performance model is sufficiently accurate, the problem of designing for manufacturability often shifts from estimating a yield to determining if the yield is above or below a yield target with a particular level of confidence. Monte Carlo simulation is therefore often used with a significance test, to check if a design's yield is above a particular yield target y with a confidence level c. Higher confidence levels denote an increased sureness that a particular outcome is not due to chance.

When a yield target is high, verifying the yield requires a large number of samples when the actual yield is above or only slightly below the target yield. For example, a three-sigma Gaussian process corresponds to only a 0.13% probability of a failure occurring. Thus, because failures are so rare for such processes, many samples that do not fail will occur before one that does. If the actual yield of a manufactured design is one, so no failures actually occur, verifying that the yield exceeds the three-sigma level, e.g., 99.87%, requires the following approximate number of samples for the confidence levels shown:

| CONFIDENCE LEVEL | NUMBER OF SAMPLES |
| --- | --- |
| 80% | 1200 |
| 90% | 1700 |
| 95% | 2200 |

Reducing the number of Monte Carlo simulation samples required to confidently compare a yield to a target yield is therefore important for final overall design verification. In the related '958 patent application incorporated by reference above, embodiments estimate the overall failure probability of a number of statistical samples based on a performance model, then simulate the samples in decreasing failure probability order. This approach helps ensure that those samples most likely to fail are simulated first, thus reducing the number of Monte Carlo simulation samples required to determine if a design yield is above a given yield target with a given confidence.

Many design iterations may occur however before a completed design is ready for a final overall yield verification that involves checking that all of the design specifications have been met. Designers often focus on one particular design specification at a time when developing and adjusting various portions of a circuit design. This approach helps designers "divide and conquer" the overall design problem into intuitively manageable aspects. Designers may thus need to quickly determine if a design will meet a particular design specification even in the worst case variation scenario for that design specification.

To that end, rather than run a full Monte Carlo verification of an entire set of design specifications during each design iteration, designers may instead test a design to see if it meets a particular design specification properly in the most demanding circumstances. Designers may therefore extract the worst statistical sample for a given design specification at the minimum computational expense, as described in the related '021 patent application incorporated by reference above. Different aspects of circuit performance may be traded off to help meet a more difficult design requirement, within some limits.

Designers may also however often find it helpful to design against a full set of multiple "design corners" or combinations of parameters that lead to a specified variation in the circuit performance measures. The variation is often expressed as a number (K) of standard variations (sigma or $\sigma$), where K is typically around three. Such corners may help a designer determine the workable ranges for design parameters, from which more detailed design refinements may be made.

Accordingly, the inventors have developed a novel way to help circuit designers and design tool vendors find the best Monte Carlo simulation samples for use as a set of design corners to substitute for a full design verification during design iterations.

DETAILED DESCRIPTION

Figure 1:
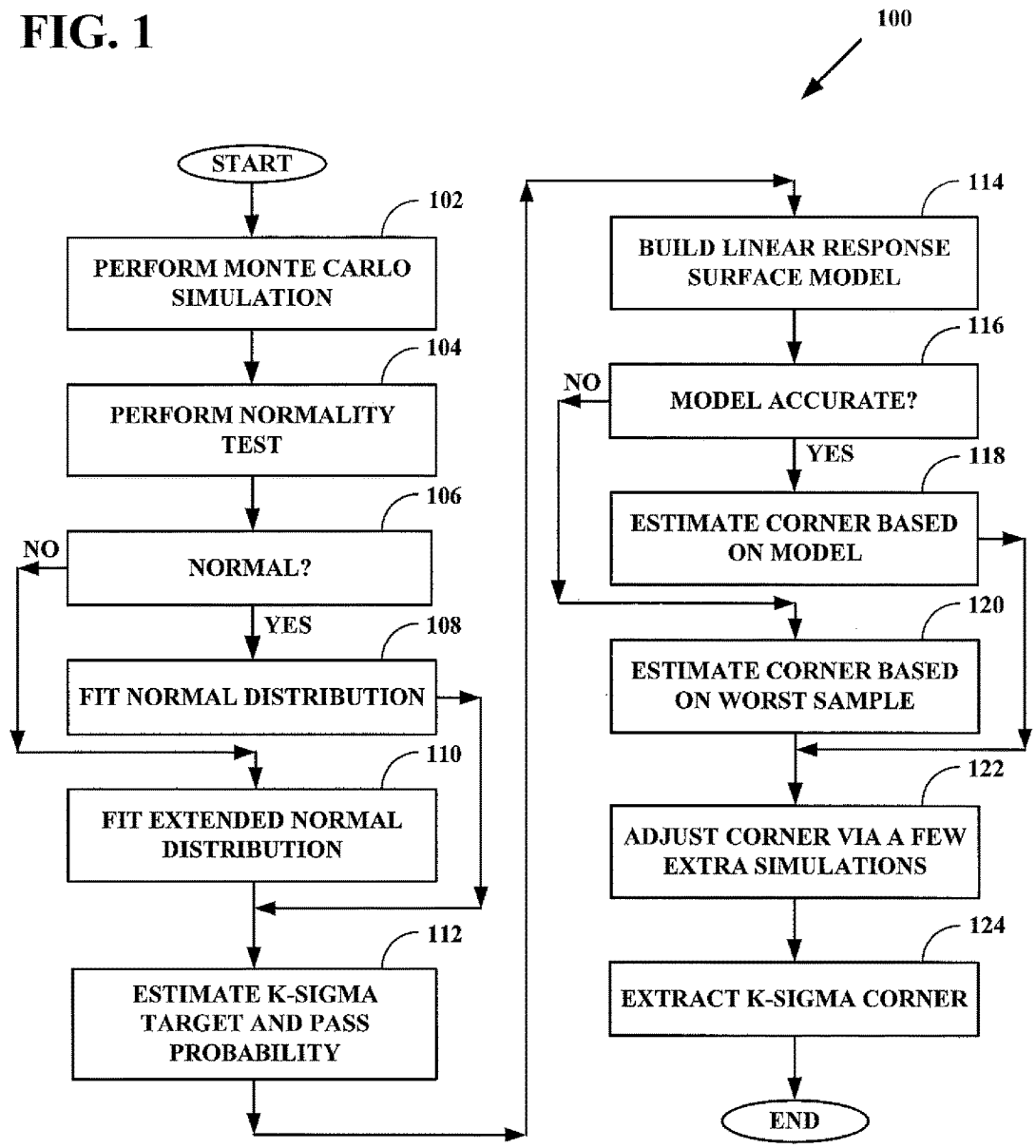
FIG. 1 is a flowchart of an efficient K-sigma corner extraction methodology 100, according to an embodiment.

This description presents a system, method, and computer program product for finding the best Monte Carlo simulation samples for use as design corners to substitute for a full design verification during design iterations. Although this description is written in terms of integrated circuit design, the invention is not limited to that application, but may be applicable to any statistically characterized process to identify design failures. The method enhances performance and efficiency of a design verification system employing the method. Designs surviving the verification process may then be translated into manufacturable descriptions of circuits, ultimately for physical fabrication of those circuits.

Embodiments of the present invention may efficiently extract design corners that define where design instances fail to meet a particular design specification at a specified variation level, often stated in K-sigma terms. The embodiments may also estimate the probability that the starting circuit design's performance may already meet the design specifications at a K-sigma variation level. Each K-sigma design corner is circuit and performance measure dependent. Foundry-provided FF (fast-fast) and SS (slow-slow) corners may not be appropriate. Embodiments of the invention therefore extract K-sigma corners from a small number of ordinary Monte Carlo samples.

Generation of design corners using the approach to be described may require fewer Monte Carlo samples for large circuits than an algorithm that simply finds the worst case. Further, embodiments may provide the same accuracy regardless of the number of variables in a circuit, unlike the worst case finding approach in which the number of required samples is a function of the number of variables in a circuit. Thus, for even very complicated circuits, one hundred to two hundred Monte Carlo samples may be all that is required to find design corners for all of a circuit's design specifications.

The result may be a remarkable reduction in the overall number of instances that must be tested to verify (e.g., prove or disprove) that design specifications will be met with adequate certainty. Also, since designers often intuitively adjust a circuit design to meet one design specification after another separately, designers may well find the identification of the K-sigma design corners for all of the design specifications at once to be very helpful during design iterations. Typical design specifications may provide requirements for current, gain, bandwidth, logic switching speed, power dissipation, or any other aspect of circuit performance as would be readily understood by a person of ordinary skill in the art. A corresponding reduction in the overall computational expense of design specification verification may also be provided, typically twenty-fold or more in some test cases in comparison to a full Monte Carlo based design verification. The increase in system efficiency should be apparent.

The overall methodology has three major aspects. First, embodiments may calculate the K-sigma target value by modeling the distribution of circuit performance. Second, embodiments may estimate the K-sigma corner by modeling the circuit such that its performance matches the K-sigma target value. Third, embodiments may verify and/or adjust the K-sigma corner by running a small number of additional simulations.

FIG. 1 shows a flowchart of an efficient K-sigma corner extraction methodology 100, according to an embodiment. At 102, the embodiment may perform an initial Monte Carlo simulation of the circuit design to build a performance model that predicts the distribution of each output circuit performance measure. If a production process is relatively well characterized by a performance model, then that performance model may be relied on to accurately predict the proportion of the future test samples that will actually fail to meet a particular design specification.

Embodiments may thus capitalize on the computational investment required to build a performance model by using its predictions to minimize larger future computational expenses. Any known method of building a performance model for a statistically varying process may be considered within the scope of the present invention. The model building process typically requires approximately one hundred Monte Carlo samples.

At 104, the embodiment may perform a normality test to determine if each particular design specification may be adequately modeled using a Gaussian type distribution. At 106, depending on the results of the normality testing, the embodiment may proceed to either 108 or 110 for each design specification. At 108, in the case that the normality test indicates a Gaussian type distribution is applicable for a given design specification, the embodiment may fit a normal distribution to each such design specification. At 110 though, in the case that the normality test determines that a Gaussian type distribution is inadequate for a particular design specification, the embodiment may fit an extended normal distribution to such a design specification instead. The normality testing and fitting of distributions will be described further below.

At 112, the embodiment may estimate the K-sigma target and the probability that the circuit design will meet all of its design specifications. At 114, the embodiment may build a linear response surface model using the samples from the initial Monte Carlo simulation and additional samples as may be required. Some embodiments may employ the methodologies described in the related patents and patent applications previously incorporated by reference for building the response surface model. At 116, the embodiment may determine whether the constructed response surface model is sufficiently accurate. Any known method of accuracy estimation may be considered within the scope of the present invention, including those in the related patents and patent applications previously incorporated by reference. At 118, in the case that the response surface model is sufficiently accurate, the embodiment may estimate the design corners based on the response surface model. At 120, in the case that the model is not sufficiently accurate, the embodiment may instead estimate the design corners based on a worst sample technique.

At 122, the embodiment may verify and/or adjust the design corner found by performing a few extra simulations near the design corner in parameter space. At 124, the embodiment may extract and tangibly output the K-sigma design corner for each design specification. The different aspects of the overall methodology are now described in more detail in terms of particular operations in this figure.

Figure 2:
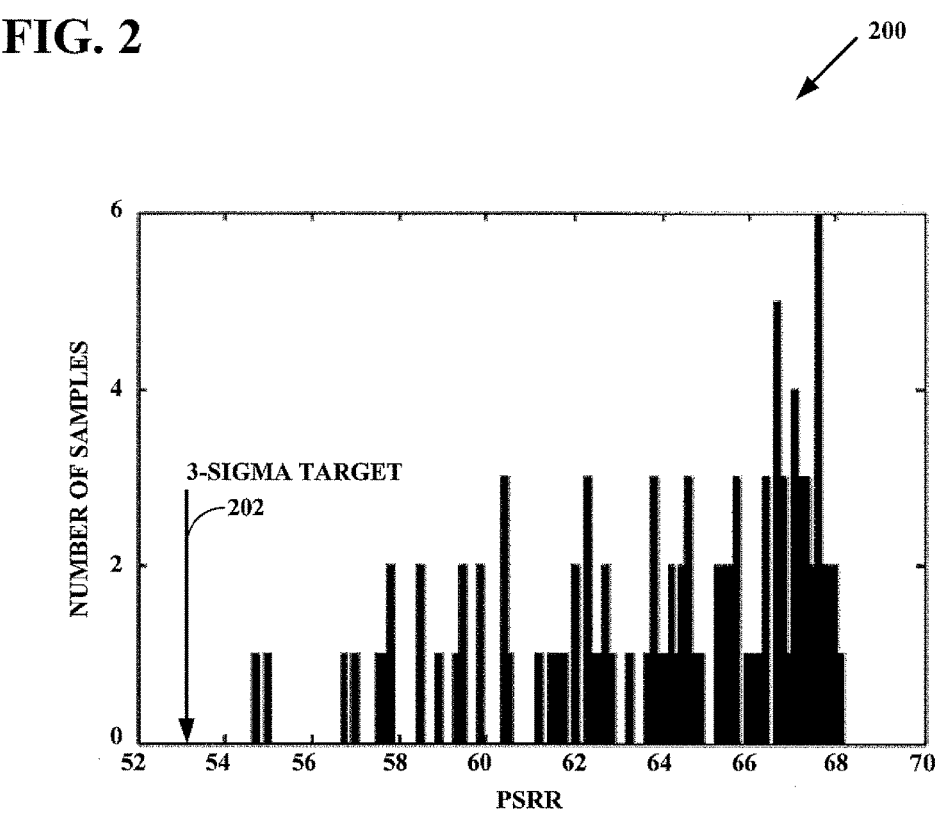
FIG. 2 is a histogram 200 of sampled values for a design specification, according to an embodiment.

FIG. 2 shows a histogram 200 of sampled values for a design specification, according to an embodiment. In this case, the design specification shown is the power supply rejection ratio (PSRR) of the circuit, a highly nonlinear design performance measure. Extracting the K-sigma target value, with K usually three or more, is typically beyond the range of the small number (e.g., one hundred) of Monte Carlo samples used by the embodiments of the present invention. That is, it is very unlikely that the small sample population will contain an actual failure example. The design corner therefore generally cannot be extracted reliably using conventional means. Unlike some prior art schemes, embodiments may therefore estimate the K-sigma target by fitting the distribution of the modeled circuit performance measures.

Note that a high PSRR value is generally desirable, so in this instance the design specification provides a minimum acceptable value. In the remaining figures, a higher performance value is associated with worse than nominal performance, so the performance value is intended to be minimized. If the performance value instead needs to be maximized, the embodiments may of course also extract K-sigma corners of negative performance.

Figure 3A:
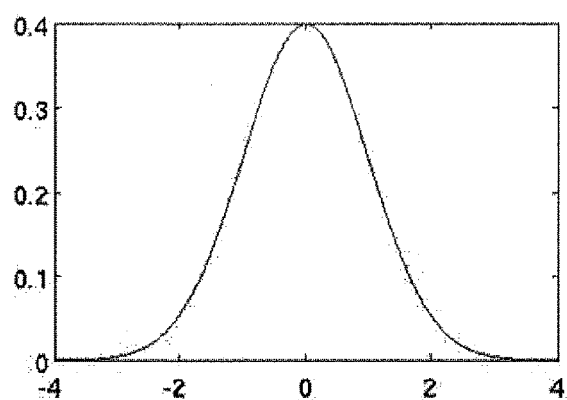
FIGS. 3A-3C are graphs 300-304 of various distributions used for modeling, according to an embodiment.
Figure 3B:
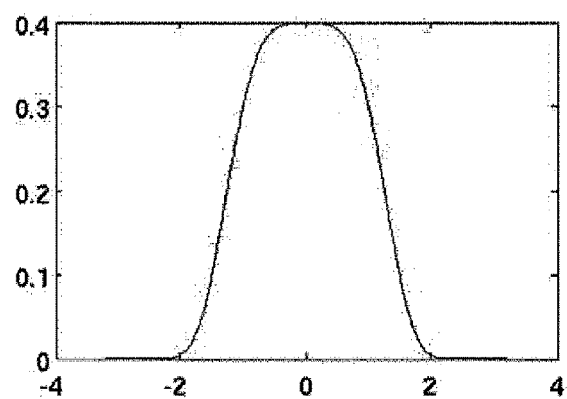
Figure 3C:
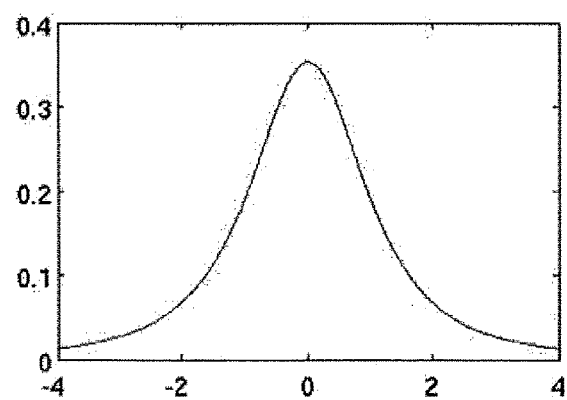

FIGS. 3A-3C are diagrams showing graphs 300-304 of various distributions used for modeling, according to an embodiment. FIG. 3A is a diagram 300 of a normal distribution. FIG. 3B is a diagram 302 of a non-normal distribution having shorter tails and a broader peak than a normal distribution. FIG. 3C is a diagram 304 of a non-normal distribution having longer tails and a lower and narrower peak than a normal distribution.

The inventors have recognized that not all performance measure distributions may be adequately described by a normal/Gaussian probability model. Embodiments may therefore perform a normality test to check if the performance measure distribution is normal. Any known normality test may be performed, including but not limited to the Kolmogorov-Smirnov test, the Jarque-Bera test, and a QQ plot correlation coefficient test, for example.

If the performance measure distribution is normal, embodiments simply estimate its mean ($\mu$) and standard deviation ($\sigma$ or sigma) according to these known formulae, where N is the number of Monte Carlo samples and each $X_i$ is the performance measure value of sample i:

$$\mu = \frac{1}{N}\sum_{i=1}^{N} X_i, \sigma = \frac{1}{N-1}\sum_{i=1}^{N} (X_i - \mu)^2$$

Embodiments may therefore in this case estimate the K-sigma target as $\mu+K*\sigma$.

If however the distribution of the performance measure is not sufficiently normal, embodiments may instead fit an extended normal distribution described by three parameters termed $x_0$, $x_{ref}$, and v. The parameters $x_0$ and $x_{ref}$ are location and scale parameters, similar to the values of $\mu$ and $\sigma$ in a normal distribution, respectively. The v parameter is a tail parameter with a value range from −1 to 1, inclusive. Distributions with shorter tails than a normal distribution (e.g., FIG. 3B) have v<0, while distributions with longer tails than a normal distribution (e.g., FIG. 3C) have v>0. For a normal distribution of course, $x_0=\mu$ and $x_{ref}=\sigma$ and v=0.

Figure 4:
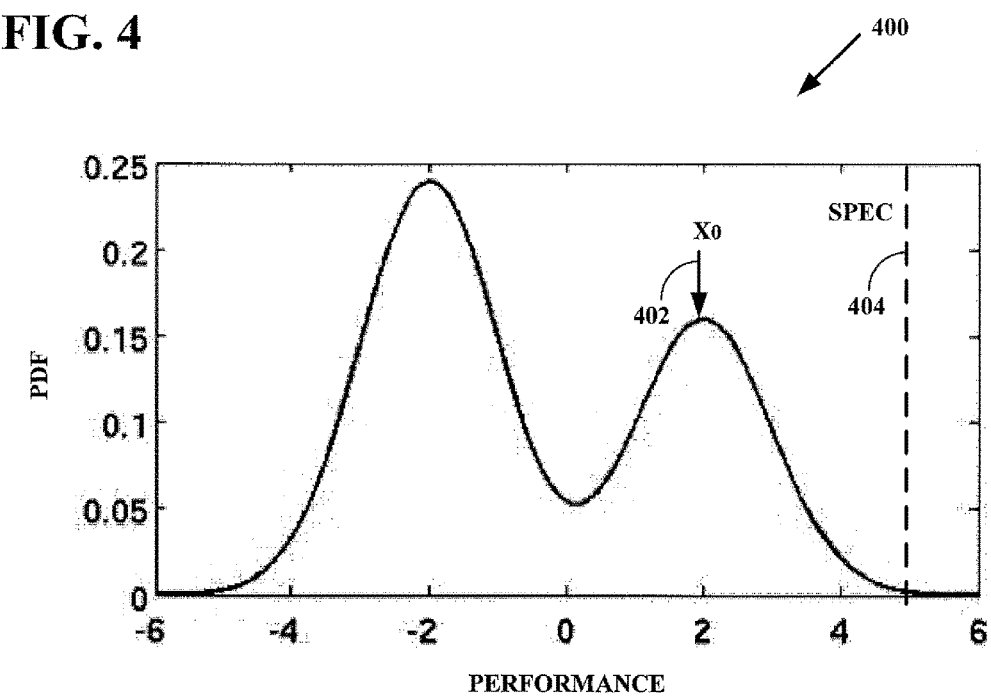
FIG. 4 is a graph 400 of a multimodal distribution and a design specification, according to an embodiment.

FIG. 4 shows a graph 400 of a multimodal distribution and a design specification, according to an embodiment. The mode of a distribution is the most frequently occurring value. The inventors have recognized that one reason a performance measure distribution may not be adequately described by a normal probability model is that the distribution may actually be multimodal.

Embodiments may therefore estimate $x_0$ using the mode of the distribution instead of the more conventional mean or average value. When there are multiple modes in the distribution, as shown, embodiments may use the mode 402 with the worse or worst performance. That is, mode 402 (and the distribution from that point onward to the performance measure specification 404) may be selected for modeling emphasis because it has a value closest to the performance measure specification 404. Thus, mode 402 (and the probability distribution function between mode 402 and the specification 404) is likely to dominate failure boundaries more than other modes.

The distribution used for the mode estimation process may be fitted using kernel density estimation as described for example in the article "Using Kernel Density Estimates To Investigate Multimodality" by B. Silverman, Journal of the Royal Statistical Society, Series B, volume 43, number 1, pages 97-99, 1981, which is hereby incorporated by reference. Briefly, in kernel density estimation the available data may be smoothed by filtering it through windows of various widths and determining how well the smoothed data fits a given kernel function, e.g., the normal density function in the Silverman article. For strongly bimodal distributions as shown, a very wide filtration window would be needed to view the data as at all unimodal. A critical window width may therefore be used to reject a statistical hypothesis about the modality of a distribution with a given confidence.

(It should be noted here that some prior art schemes attempt to fit a small number of Monte Carlo samples directly to a target value from a target yield using kernel density distribution techniques like that of Silverman. These schemes may then estimate a design corner by finding a worst Monte Carlo sample from the small population and extrapolating. Such schemes should not be confused with the embodiments of the present invention. The embodiments instead may build a performance model and test it for accuracy, and may even increase the complexity of the performance model as needed to achieve sufficient accuracy, as described in the related patents and applications incorporated by reference. Further, the embodiments may employ a more sophisticated distribution model that considers both non-normal and multimodal distributions, to be described in more detail shortly.)

After fitting $x_0$, embodiments may determine whether the distribution is long-tailed or short-tailed, relative to the normal distribution. Embodiments may make this determination by selecting all the samples on the same side of the distribution as the performance specification (relative to $x_0$) and estimating variance and kurtosis, defined here as:

$$\text{var} = \frac{1}{N} \sum_{i=1}^{N} (X_i - x_0)^2,$$

$$\text{kurt} = \sum_{i=1}^{N} (X_i - x_0)^4 / (N \cdot \text{var}^2)$$

In one embodiment, the distribution may be defined as long-tailed if kurt >3, and short-tailed if kurt <3. For the long-tailed case, embodiments may estimate a long-tailed distribution parameterized by $x_0$, $x_{ref}$, and v, such as the following exemplary and non-limiting probability density function (PDF):

$$PDF\left(\frac{x - x_0}{x_{ref}}\right) = t(1/v)$$

where $t(1/v)$ is the Student's t-distribution with $1/v$ degrees of freedom. Any other parameterizable distribution, such as the generalized extreme value distribution, may be used in other embodiments.

For the short-tailed case, embodiments may estimate a short-tailed distribution parameterized by $x_0$, $x_{ref}$, and v, such as the following exemplary and non-limiting distribution:

$$CDF\left(\frac{x - x_0}{x_{ref}}\right) = NormCDF\left(x + \frac{v^2}{6}x^3\right)$$

where NormCDF is the cumulative distribution function (CDF) of the standard normal distribution. Any other parameterizable distribution, such as the Irwin-Hall distribution, may be used in other embodiments. In both the long-tailed and the short-tailed cases, embodiments may use maximum likelihood estimation to estimate $x_{ref}$ and v from the Monte Carlo samples.

Figure 5:
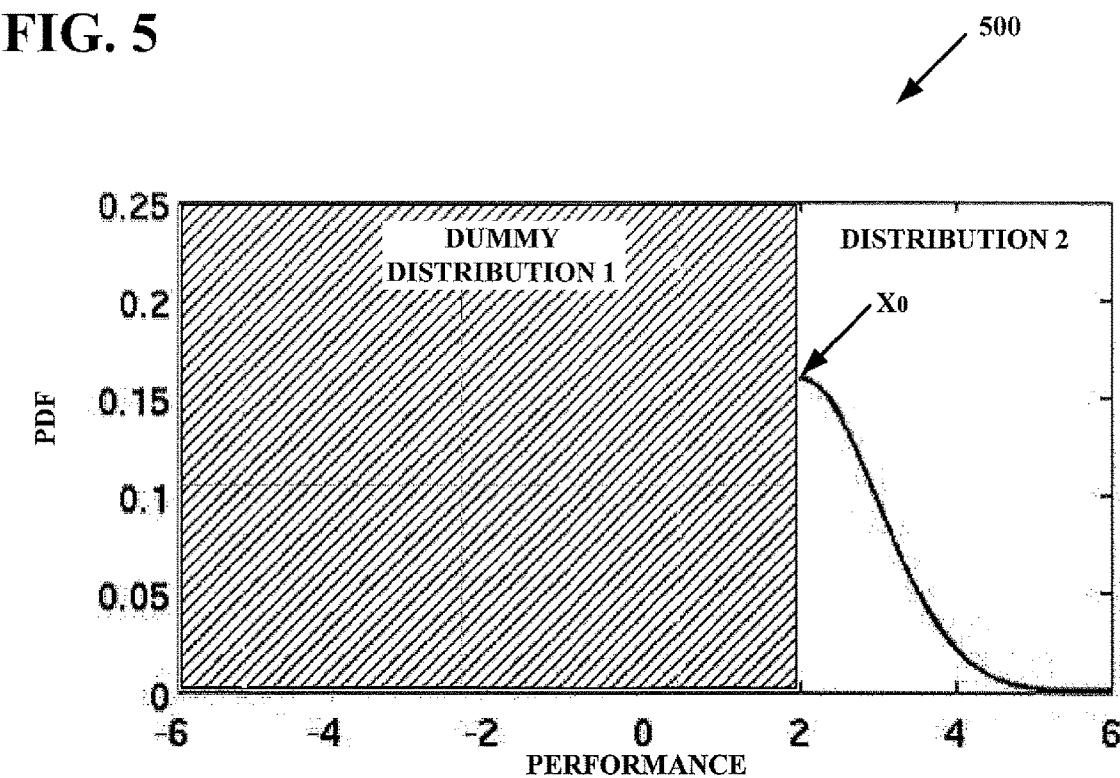
FIG. 5 is a graph 500 of an extended distribution used for modeling, according to an embodiment.

FIG. 5 shows a graph 500 of an extended distribution used for modeling, according to an embodiment. The previously fit distribution always has $CDF(x_0)=0.5$. Embodiments may therefore further adjust the extended normal distribution so it has a correct cumulative distribution function value at mode $x_0$. In practice, $CDF(x_0)=c$ may be estimated from the percentile of $x_0$. The embodiments may thus adjust the distribution so that $CDF\_new(x_0)=c$ by redefining the distribution as a mixture distribution.

That is, from $x_0$ away from the performance measure specification a first distribution (termed Dummy Distribution 1 here) may be used, while from $x_0$ toward the performance measure specification, the separate extended normal distribution (termed Distribution 2 here) may be used. Distribution 2 is likely to govern the behavior of a circuit design performance measure near the performance specification.

The mixture distribution PDF may thus be defined as the weighted sum of two components that "switch over" at the mode $x_0$ (versus the more usual median):

$$PDF_{new}(x) = c \cdot PDF(x) + (1-c) \cdot PDF_2(x)$$

where $PDF_1(x)$ is any distribution satisfying $PDF_1(x)=0$ when $x>x_0$, and $PDF_2(x)$ is the right side of the previously fit distribution:

$$PDF_2(x) = \begin{cases} 2 \cdot PDF(x) & x \geq x_0 \\ 0 & x < x_0 \end{cases}$$

Embodiments may estimate the K-sigma target from the CDF of the adjusted distribution:

$$CDF_{new}(x) = \begin{cases} 2 \cdot (1-c) \cdot CDF(x) + 2c - 1 & x \geq x_0 \\ \text{Percentile of } x \text{ within samples} & x < x_0 \end{cases}$$

In addition to estimating the K-sigma target, embodiments may also calculate the probability that the performance measure already meets K-sigma requirements. First, embodiments may generate M bootstrap estimates of the K-sigma target $T=[T_1, T_2, \ldots, T_M]$, following this sampling and estimation routine:

For i=1 to M:
    Resample the Monte Carlo samples with replacement
    Estimate the K-sigma target $T_i$
end Next, embodiments may empirically expand the bootstrap sample range by $(1+|v|)$ to compensate for bias due to the sampling of a small population with replacement, e.g.:

$$T_i = \text{median}(T) + (T_i - \text{median}(T)) \times (1+|v|)$$

Embodiments may then estimate the probability of passing a performance specification at K-sigma as the percentage of samples within T performing better than the specification.

An alternative embodiment may estimate the probability of passing a performance specification at K-sigma from a binomial distribution. The binomial distribution based methodology may be chosen if it is a stronger indication of whether the circuit will pass or fail the specification. Specifically, the alternative embodiment may add to the embodiment previously described by this approach:

If the pass probability is less than 0.5 and the binomial failure confidence is greater than (1−the pass probability), then set the pass probability to (1−the binomial failure confidence).

If the pass probability is greater than 0.5 and the binomial pass confidence is greater than the pass probability, then set the pass probability to the binomial pass confidence.

The alternative embodiment may define the failure confidence of the binomial distribution as the confidence c such that the upper bound of a one-sided Clopper-Pearson confidence interval equals the target yield y. (Clopper-Pearson confidence intervals are described in more detail in the article by C. Clopper and E. Pearson "The Use of Confidence or Fiducial Limits Illustrated in the Case of the Binomial", Biometrika, volume 24, number 4, December 1934, p. 404-413, which is hereby incorporated by reference). Thus, if there are k failures in N samples, the binomial failure confidence is calculated as:

$$c_{fail} = \sum_{i=0}^{k-1} binopdf(N-i, N, y)$$

This is the total probability of having less than k failures when yield is y.

The alternative embodiment may define the binomial pass confidence as the confidence c such that the lower bound of a one-sided Clopper-Pearson confidence interval equals the target yield y. Thus, if there are k failures in N samples, the binomial pass confidence is calculated as:

$$c_{pass} = \sum_{i=k+1}^{N} binopdf(N-i, N, y) = 1 - \sum_{i=0}^{k} binopdf(N-i, N, y)$$

This is the total probability of having more than k failures when yield is y.

Figure 6:
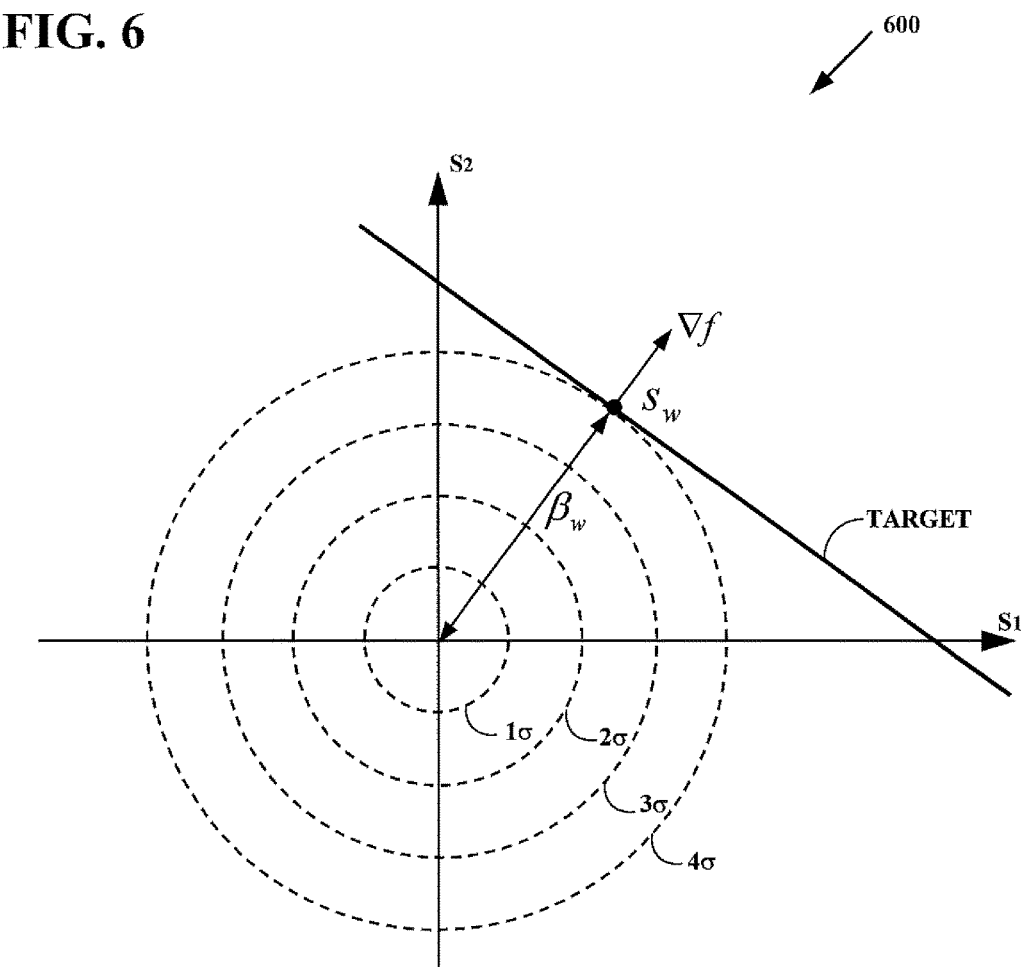
FIG. 6 is a graph 600 of a model-based corner estimation methodology, according to an embodiment.

FIG. 6 shows a graph 600 of a model-based corner estimation methodology, according to an embodiment. The second major aspect of the methodology, after estimating the K-sigma target, is to extract the design corner such that the performance meets the K-sigma target. Embodiments may first fit a linear performance function using the orthogonal matching pursuit (OMP) method, as described for example in U.S. Pat. No. 8,813,009 previously incorporated by reference:

$$f(s) = f_0 + \nabla f \cdot (s - s_0)$$

where f(s) is a modeled performance measure for a parameter s, $f_0$ is a nominal output value for a nominal parameter value $s_0$, and $\nabla f$ is the performance gradient.

The embodiments thus look to extract the design corner with the highest probability of happening, out of the infinite number of corners that match the target T obtained from the model. The set of corners satisfying the performance specification may be represented by a hyperplane in parameter space. For clarity, such a hyperplane is shown as a target line in the two-dimensional exemplary depiction of the performance specification that for simplicity depends here on only two parameters $s_1$ and $s_2$. The desired corner that is closest to the nominal case in terms of probability is shown as $s_w$, which is located along the gradient of the performance measure a distance $\beta_w$ away from the nominal values of $s_1$ and $s_2$. Embodiments may calculate $s_w$ as:

$$s_w = s_0 + \frac{C \cdot \nabla f \cdot (T - f_0)}{\nabla f^T \cdot C \cdot \nabla f}$$

where C is the covariance matrix of parameters.

In the example shown here, the performance measure is depicted as being approximately equally sensitive to $s_1$ and $s_2$ for clarity, but that is by no means typical nor required. The performance measure for each performance specification may be extremely complex and nonlinear, and may also depend on any number of parameters. The desired design corner in this exemplary depiction is shown at the 4-sigma point (e.g., K=4), but a design corner for any particular variation may be found by the methodology.

The extracted design corner value depends on the response surface model accuracy. The model accuracy may for example be determined using the empirical methods described in U.S. Pat. No. 8,954,910, previously incorporated by reference. If the response surface model is however deemed insufficiently accurate (as noted on FIG. 1 item 116), embodiments may instead fall back on extrapolating from the worst sample found (as noted on FIG. 1 item 120) and its related performance value $f_m$. That is, for a given worst sample among the Monte Carlo samples, having parameter value $s_m$, the estimated corner value for a given performance specification is:

$$s_w = s_0 + (s_m - s_0) \times scale$$

where $$scale = (T - f_0)/(f_m - f_0)$$

Note however, that this worst case approach is different from the worst case approaches described in the previously incorporated patent applications. Here, embodiments may simply select the worst case from among the small number of Monte Carlo simulations already run, which will probably not be far enough away from nominal results to meet the K-sigma requirement. The embodiments may however extrapolate from that worst case a sufficient distance to find a design corner that does meet the K-sigma requirement. This approach is useful because it at least provides a starting point for the third major aspect of the methodology, now described.

Figure 7:
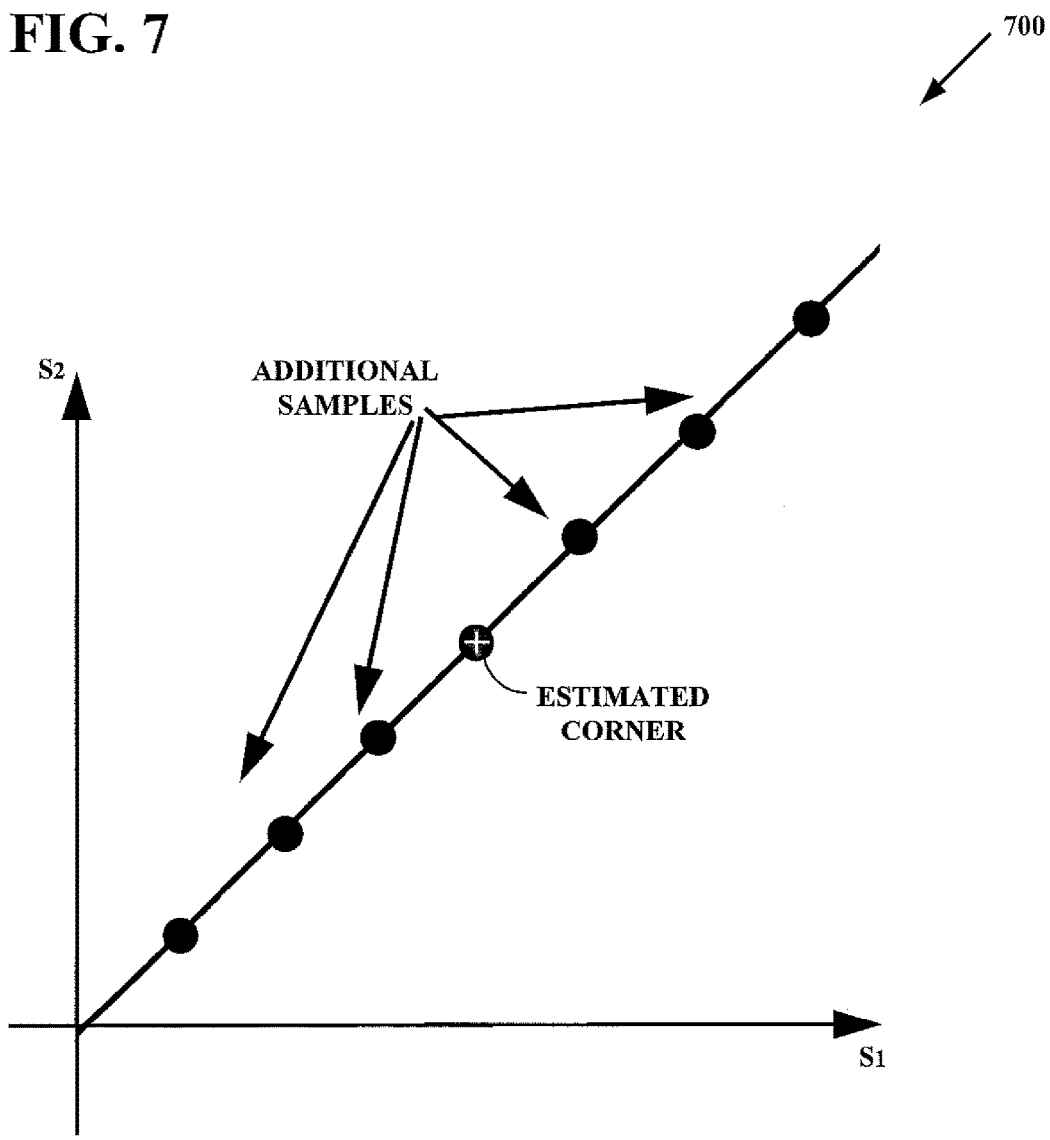
FIG. 7 is a graph 700 of a corner verification and adjustment methodology, according to an embodiment.

FIG. 7 shows a graph 700 of a corner verification and adjustment methodology, according to an embodiment. For a highly nonlinear circuit performance, the estimated design corner may not match the target well. Embodiments may therefore adjust the corner by searching on the line connecting the nominal point and the estimated point $s_w$ for the corner closest to the target, however found. The search typically requires only a small number of additional simulations. Most of the time, the corner is already accurate because it was found with an accurate response surface model, and the search stops after performing only one additional simulation to verify the estimated corner. In some instances however, several additional simulations are needed in that region of parameter space to find enough performance measures to find a well-estimated design corner.

For example, embodiments of the present invention were tested by extracting the K-sigma design corners of an operational amplifier designed in an exemplary 45 nm process. The test objective was to find the 3-sigma design corner for each output, corresponding to the verification condition of 99.87% yield. Meeting this objective with conventional yield verification processes normally requires more than 2300 points for a 95% confidence, as previously noted. The accuracy of the extracted corners was verified against a total of ten thousand Monte Carlo simulations.

In one example test, the design corner for the current of the operational amplifier was extracted using one hundred Monte Carlo samples. One additional simulation verified the corner accuracy. In a second example test, the design corner for the power supply rejection ratio of the operational amplifier was extracted, again using the same one hundred Monte Carlo samples. In this case, because PSRR is highly nonlinear, seven additional simulations were needed to adjust the extracted corner.

Embodiments of the design corner extraction methodology described above thus required only 107 total simulations, with the design corners for each output correctly found. These results represent notable increase in speed compared to running a full Monte Carlo simulation based verification directly. The results are summarized in the table below:

|  | Mean | Specification | Actual 3-Sigma Value | 3-Sigma Corner Value | Confidence of Passing 3-Sigma |
| --- | --- | --- | --- | --- | --- |
| Current | 112.9 uA | <140 uA | 127.6 uA | 127.9 uA | 95.5% |
| PSRR | 63.79 dB | >50 dB | 53.84 dB | 52.97 dB | 81.8% |

Figure 8:
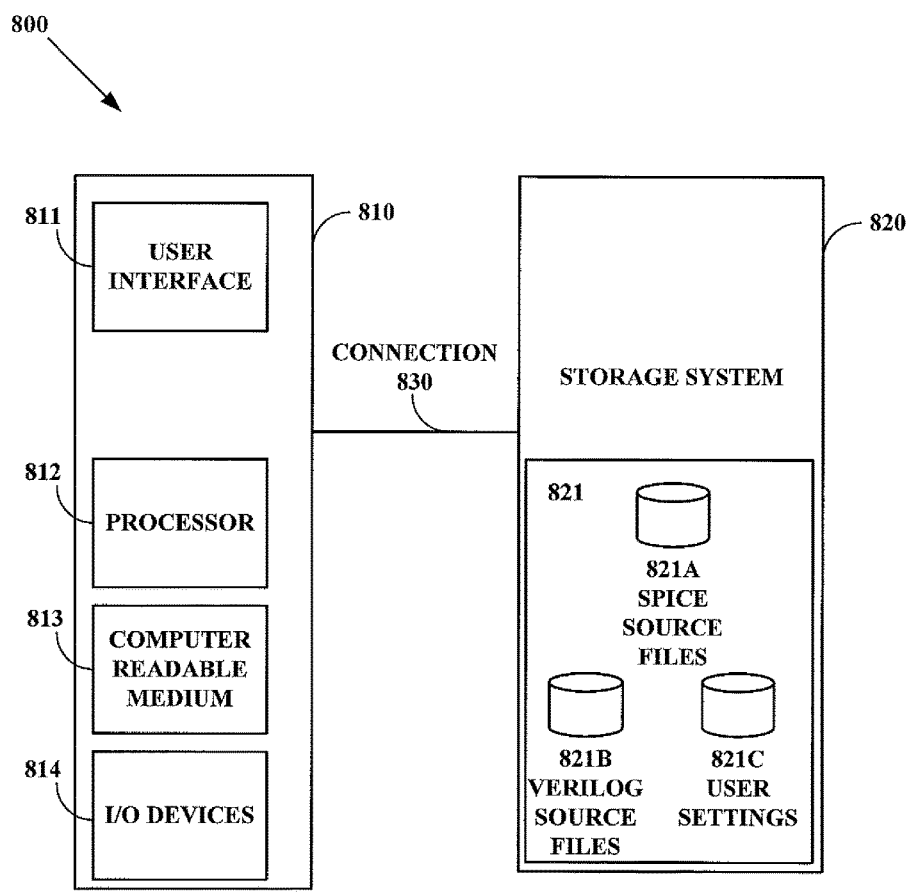
FIG. 8 is a block diagram of a circuit analysis system 800, according to an embodiment.

FIG. 8 shows a block diagram of an exemplary circuit analysis system 800, according to an embodiment. This system may provide simulator functionality for any of the methods described above. A user may access the system 800 through a standalone client system, client-server environment, or a network environment. System 800 may comprise one or more clients or servers 810, one or more storage systems 820, and a connection or connections 830 between and among these elements.

Client 810 may execute instructions stored on transitory or non-transitory computer readable medium 813 with processor 812, and may provide a user interface 811 to allow a user to access storage system 820. The instructions may be part of a software program or executable file that may operate electronic design automation (EDA) software. Client 810 may be any computing system, such as a personal computer, workstation, mobile computer, or other device employing a processor which is able to execute programming instructions. User interface 811 may be a graphical user interface (GUI) run in a user-controlled application window on a display. A user may interact with user interface 811 through one or more input/output (I/O) devices 814 such as a keyboard, a mouse, or a touch screen.

Storage system 820 may take any number of forms, including but not limited to a server with one or more storage devices attached to it, a storage area network, or one or a plurality of non-transitory computer readable media. Databases 821 may be stored in storage system 820 such that they may be persistent, retrieved, or edited by the user. Databases 821 may include SPICE source files 821A, Verilog source files 821B, and a user input database 821C for example. These databases may be kept as separate files or systems, or may be merged together in any appropriate combination.

Only one client 810 is shown connected to storage system 820 through connection 830, which may be a simple direct wired or wireless connection, a system bus, a network connection, or the like, to provide client 810 with access to storage system 820. In another aspect, connection 830 may enable multiple clients 810 to connect to storage system 820. The connection may be part of a local area network, a wide area network, or another type of network, again providing one or more clients with access to storage system 820. Depending on system administrator settings, client 810's access to system storage 820 or to other clients may be limited.

Figure 9:
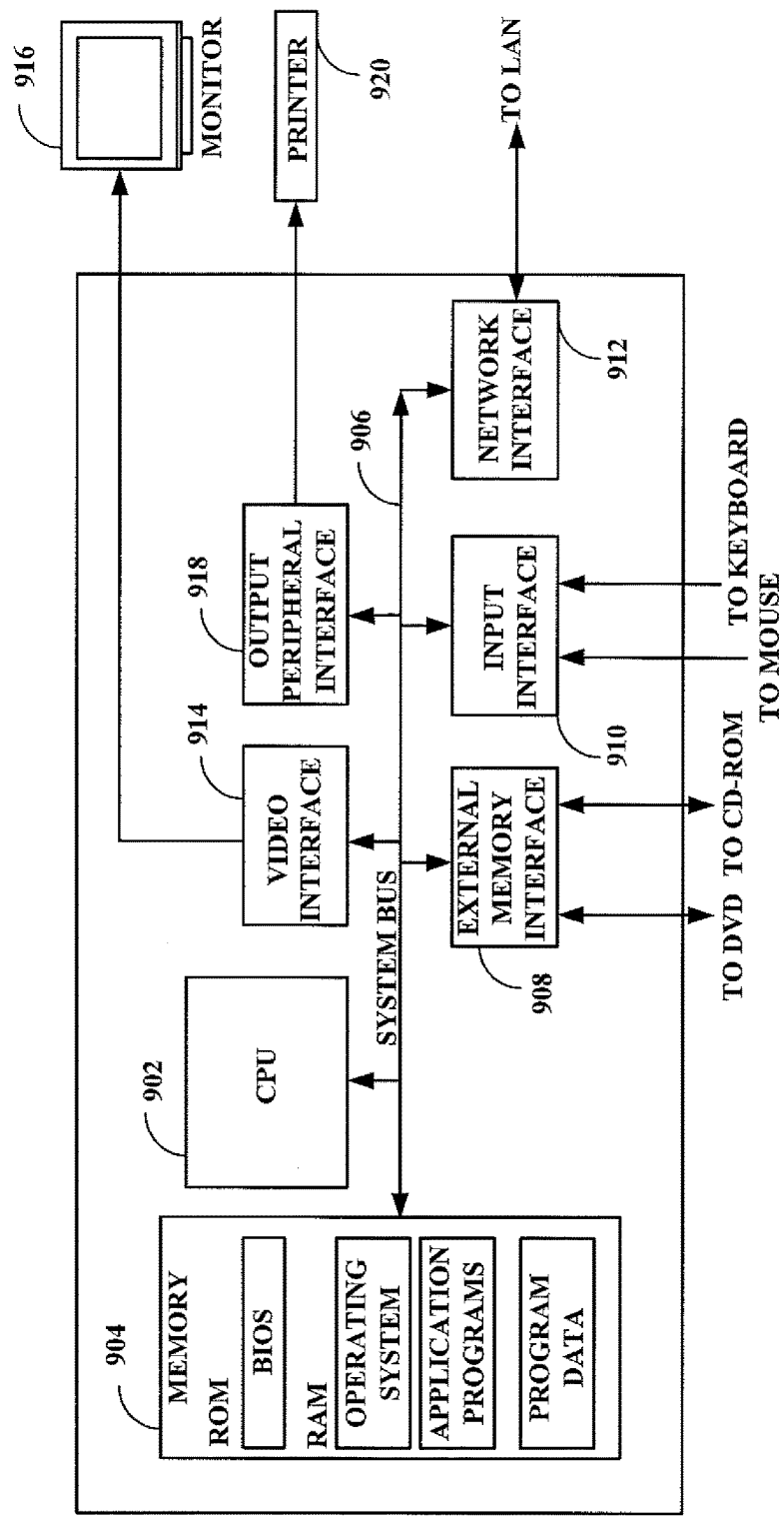
FIG. 9 is a diagram of a computer system 900, according to an embodiment.

FIG. 9 depicts an exemplary computer system comprising the structure for implementation of embodiments described above. Computer system 900 comprises a central processing unit (CPU) 902 that processes data stored in memory 904 exchanged via system bus 906. Memory 904 typically includes read-only memory, such as a built-in operating system, and random-access memory, which may include an operating system, application programs, and program data. Computer system 900 also comprises an external memory interface 908 to exchange data with a DVD or CD-ROM for example. Further, input interface 910 may serve to receive input from user input devices including but not limited to a keyboard and a mouse. Network interface 912 may allow external data exchange with a local area network (LAN) or other network, including the internet. Computer system 900 also typically comprises a video interface 914 for displaying information to a user via a monitor 916. An output peripheral interface 918 may output computational results and other information to output devices including but not limited to a printer 920.

Computer system 900 may comprise for example a personal computer or an engineering workstation, each of which is widely known in the art and is commonly used for integrated circuit design tasks, along with software products commercially available for performing computer-aided integrated circuit design tasks. Computer system 900 may also comprise a mobile computer, including for example a tablet computer or a smart phone. The computer system of FIG. 9 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

What is claimed is:

1. A processor-implemented method for finding Monte Carlo simulation samples for use as corners of a design for a circuit, to facilitate the provision of a manufacturable description of the circuit, the method comprising:
generating the Monte Carlo circuit simulation samples and corresponding circuit performance measures using a circuit simulator tool;
modeling distributions of the circuit performance measures corresponding to input circuit design specifications, wherein the modeling includes fitting an extended normal distribution model for at least one generated circuit performance measure distribution;
calculating corner target values having specified variations using the modeled circuit performance measure distributions;
estimating corner values having the specified variations such that the estimated corner values match the calculated corner target values; and
tangibly outputting the estimated corner values to provide the manufacturable description of the circuit.

2. The method of claim 1 wherein the method further comprises:
verifying the estimated corner values by performing additional simulations; and
selectively adjusting the estimated corner values by performing further additional simulations and scaling from the closest estimated corner values, based on the match between the calculated corner target values and the estimated corner values.

3. The method of claim 1 wherein the method further comprises estimating the probability that the design meets all the input circuit design specifications at the specified variations by estimating the percentage of the generated Monte Carlo circuit simulation samples that perform better than the input circuit design specifications.

4. The method of claim 1 wherein the estimating uses one of an accuracy-tested response surface model and a worst one of the Monte Carlo samples.

5. The method of claim 1 wherein the modeling further comprises:
testing each generated circuit performance measure distribution for normality; and
selectively fitting one of a normal distribution model and the extended normal distribution model to each generated circuit performance measure distribution, based on the testing.

6. The method of claim 5 wherein the fitting of the extended normal distribution model further comprises:
detecting a mode of each generated circuit performance measure distribution that is closest to the corresponding input circuit design specification;
calculating a variance value and a kurtosis value from the generated circuit performance measure occurring between the mode and the corresponding input circuit design specification; and
fitting one of a Student's t-distribution and a cubic normal cumulative distribution function, based on the kurtosis value.

7. The method of claim 6 wherein the fitting of the extended normal distribution model further comprises adjusting the extended normal distribution model to have a cumulative distribution function value at the mode that is estimated from a percentile of the mode.

8. The method of claim 1 wherein the estimating further comprises, for each circuit performance measure, finding the corner value with the highest probability of occurrence by proceeding in a parameter value space from a nominal design parameter value along a circuit performance measure gradient vector scaled by a covariance matrix of parameters, until the corner target value is met.

9. The method of claim 8 wherein the estimating further comprises, for each circuit performance measure, selectively extrapolating in the parameter value space from the nominal design parameter value toward an estimated corner value based on a worst case sample parameter value among the generated Monte Carlo circuit simulation samples and a corresponding worst case generated circuit performance measure.

10. A system for finding Monte Carlo simulation samples for use as corners of a design for a circuit, to facilitate the provision of a manufacturable description of the circuit, the system comprising:
a non-transitory memory storing executable instructions; and
a processor executing instructions for:
generating the Monte Carlo circuit simulation samples and corresponding circuit performance measures using a circuit simulator tool;
modeling distributions of the circuit performance measures corresponding to input circuit design specifications, wherein the modeling includes fitting an extended normal distribution model for at least one generated circuit performance measure distribution;
calculating corner target values having specified variations using the modeled circuit performance measure distributions;
estimating corner values having the specified variations such that the estimated corner values match the calculated corner target values; and
tangibly outputting the estimated corner values to provide the manufacturable description of the circuit.

11. The system of claim 10 further comprising instructions for:
verifying the estimated corner values by performing additional simulations; and
selectively adjusting the estimated corner values by performing further additional simulations and scaling from the closest estimated corner values, based on the match between the calculated corner target values and the estimated corner values.

12. The system of claim 10 further comprising instructions for estimating the probability that the design meets all the input circuit design specifications at the specified variations by estimating the percentage of the generated Monte Carlo circuit simulation samples that perform better than the input circuit design specifications.

13. The system of claim 12 further comprising instructions for selectively estimating the probability that the design meets all the input circuit design specifications at the specified variations with a binomial distribution, based on Clopper-Pearson confidence intervals.

14. The system of claim 10 wherein the instructions for the modeling further comprise instructions for:
- testing each generated circuit performance measure distribution for normality; and
- selectively fitting one of a normal distribution model and the extended normal distribution model to each generated circuit performance measure distribution, based on the testing.

15. The system of claim 14 wherein the instructions for the fitting of the extended normal distribution model further comprise instructions for:
- detecting a mode of each generated circuit performance measure distribution that is closest to the corresponding input circuit design specification;
- calculating a variance value and a kurtosis value from the generated circuit performance measure occurring between the mode and the corresponding input circuit design specification; and
- fitting one of a Student's t-distribution and a cubic normal cumulative distribution function, based on the kurtosis value.

16. The system of claim 10 wherein the estimating uses one of an accuracy-tested response surface model and a worst one of the Monte Carlo samples.

17. The system of claim 10 wherein the instructions for the estimating further comprise instructions for, for each circuit performance measure, finding the corner value with the highest probability of occurrence by proceeding in a parameter value space from a nominal design parameter value along a circuit performance measure gradient vector scaled by a covariance matrix of parameters, until the corner target value is met.

18. The system of claim 17 wherein the instructions for the estimating further comprise instructions for, for each circuit performance measure, selectively extrapolating in the parameter value space from the nominal design parameter value toward an estimated corner value based on a worst case sample parameter value among the generated Monte Carlo circuit simulation samples and a corresponding worst case generated circuit performance measure.

19. A non-transitory computer readable medium storing instructions that, when executed by a processor, perform a method for finding Monte Carlo simulation samples for use as corners of a design for a circuit, to facilitate the provision of a manufacturable description of the circuit, the method comprising:
using a processor:
- generating the Monte Carlo circuit simulation samples and corresponding circuit performance measures using a circuit simulator tool;
- modeling distributions of the circuit performance measures corresponding to input circuit design specifications, wherein the modeling includes fitting an extended normal distribution model for at least one generated circuit performance measure distribution;
- calculating corner target values having specified variations using the modeled circuit performance measure distributions;
- estimating corner values having the specified variations such that the estimated corner values match the calculated corner target values; and
- tangibly outputting the estimated corner values to provide the manufacturable description of the circuit.

20. The medium of claim 19 further comprising:
- verifying the estimated corner values by performing additional simulations; and
- selectively adjusting the estimated corner values by performing further additional simulations and scaling from the closest estimated corner values, based on the match between the calculated corner target values and the estimated corner values.

* * * * *